United States Patent [19]

Beauchamp et al.

[11] Patent Number: 4,491,298

[45] Date of Patent: Jan. 1, 1985

[54] BUTTERFLY VALVE

[75] Inventors: David C. Beauchamp, Near Studley; Philip J. Burton, Great Barr, both of England

[73] Assignee: Charles Winn (Valves) Limited, Birmingham, England

[21] Appl. No.: 416,169

[22] Filed: Sep. 9, 1982

[30] Foreign Application Priority Data

Sep. 11, 1981 [GB] United Kingdom ............... 8127582

[51] Int. Cl.$^3$ ............................................. F16K 1/22
[52] U.S. Cl. .................................... 251/306; 137/74; 251/173
[58] Field of Search ................. 137/72, 74; 251/173, 251/306

[56] References Cited

U.S. PATENT DOCUMENTS

| 4,202,365 | 5/1980 | Aoki ..................................... 137/72 |
| 4,228,816 | 10/1980 | Aoki ..................................... 137/72 |
| 4,231,546 | 11/1980 | Eggleston ...................... 251/174 X |
| 4,244,387 | 1/1981 | Snape ................................... 137/72 |
| 4,303,249 | 12/1981 | Illy ................................ 251/173 X |
| 4,341,233 | 7/1982 | Broadway ........................... 137/72 |

Primary Examiner—Harold W. Weakley
Attorney, Agent, or Firm—Scrivener, Clarke, Scrivener and Johnson

[57] ABSTRACT

A fire-safe butterfly valve (FIG. 2) provides bi-directional sealing. In normal duties a polymeric seal provides forward and reverse sealing against the edge of the valve disc, the polymeric seal being resiliently loaded in the axial direction of the valve by a resilient metal ring. The metal ring provides a bi-directional seal with the disc edge in the event of destruction of the polymeric seal by fire. The metal ring in transverse cross-section consists of an arm having a curved radially inner end presenting a convex surface for engagement with the disc edge. For fluid pressure acting from the smaller diameter side of the disc, in the burnt out condition, the curvature of the radially inner end of the metal ring gives rise to an increased sealing force with the disc edge as the disc moves in response to the fluid pressure and the ring inner end remains in rolling contact with the disc edge.

3 Claims, 3 Drawing Figures

BUTTERFLY VALVE

SPECIFIC DESCRIPTION

This invention relates to a butterfly valve of the kind comprising a valve body provided with a fluid flow passage, a valve disc pivotally mounted in the passage for rotation about an axis extending substantially transversely of the passage, an annular seal assembly carried by the body and encircling the fluid flow passage, the edge of the disc presenting a seal engaging surface which sealingly engages with the seal assembly in the closed position of the disc to close the flow passage, and the seal engaging surface tapering radially inwardly of the disc from the front to the rear of the disc. Such a valve will hereinafter be referred to as 'a butterfly valve of the kind set forth'. The terms 'front' and 'rear' of the disc are used for convenience only and do not imply any preferred direction of fluid flow through the valve.

The invention is particularly, but not exclusively, concerned with butterfly valve assemblies of the kind set forth in which the seal assembly comprises a metal sealing ring. In recent years there has been an increasing requirement for butterfly valves having fire-safe characteristics, and various proposals have been made for valves in which a metal sealing ring is provided to maintain a sealing action following a fire. In some cases the metal ring is in operation during normal use, but in others the metal ring serves as a back-up seal in the event that a primary seal is destroyed by fire.

It is relatively easy to design a valve which has satisfactory sealing characteristics for one direction of fluid flow combined with a fire-safe characteristic, but the present invention is directed at the problem of providing satisfactory bi-directional sealing, that is sealing against flow in either direction, combined with a fire-safe characteristic.

Since the disc tends to be deflected slightly in the axial direction of the fluid flow passage by fluid pressure forces, the seal assembly needs to accommodate such deflections whilst maintaining an effective seal.

A first aspect of the invention is concerned with providing an enhanced sealing force between a metal sealing ring and the disc when fluid pressure is applied to the rear of the disc.

Since forward displacement of the disc results in a reduction in the effective diameter of the seal engaging surface of the disc where it contacts the seal assembly, due to the taper of the seal engaging surface, the sealing force would normally be reduced by such displacement.

The surprising discovery has been made that it is possible to obtain an increased sealing engagement between a metal seal and the sealing surface of the valve disc by mechanical interference forces when the disc is moved in the forward direction.

It has previously been proposed in U.K. Specification No. 1 561 593 to obtain an increased sealing force with a metal sealing ring by mechanical interference, but only for displacement of the disc in the rearward direction for which, of course, an increasing wedging action is produced by the effective increase in the diameter of the disc.

According to the first aspect of the invention in a butterfly valve of the kind set forth the seal assembly comprises a resilient metal ring which in transverse cross-section comprises a radially inwardly extending arm, the radially outer end of the arm is clamped to the valve body, and the radially inner end of the arm presents a convex surface for engagement by the seal engaging surface of the disc, the arrangement being such that the point of contact of the convex surface with the disc is located in a rearward direction of the disc from a fulcrum point of the arm about which the unclamped portion of the arm pivots on deflection of the disc when fluid pressure is applied to the rear of the disc.

The convex surface is conveniently part-circular, but depending upon the shape of the seal engaging surface of the disc it could be a part of another curve.

The curvature of the convex surface and the length of the unclamped portion of the arm can then be chosen such that on progressive forward deflection of the disc a progressively increasing radial force is exerted between the metal ring and the disc due to interference between the locus of pivotal movement about the fulcrum point of the convex surface of the disc at the contact point, and the locus of movement of the disc at the contact point when a substantially rolling engagement is maintained between the disc and the convex surface. It will be understood that if, during rolling movement of the convex surface on the seal engaging surface, the expected inward radial displacement (relative to the disc axis) of the contact point of the convex surface resulting from pivotal movement of the arm about its fulcrum point is arranged to be greater than the actual inward radial displacement of the contact point permitted by the taper of the seal engaging surface of the disc, a rolling action will result in radial compression of the unclamped portion of the arm.

Preferably the metal ring is formed from sheet material, the radially inner margin of the ring being deformed to provide said convex surface.

Prior to assembly of the metal ring to the valve, the ring is preferably substantially flat, apart from its inner margin.

The magnitude of the wedging forces needs to be kept within a predetermined range to ensure that on the one hand a sufficient sealing force is achieved and that on the other hand excessive galling, transfer of metal, does not take place between the metal ring and the disc. The best dimensions and configuration of the metal ring are most easily determined by experiment.

In order to minimise galling it is preferable to arrange for a hardness difference of at least 75 Vickers between the sealing engaging surface of the disc and the convex surface of the metal ring. The harder surface may be either the seal engaging surface or the convex surface.

For example, when the disc is of aluminium bronze the metal ring may be a high nickel alloy, preferably a Nimonic. When the disc is of stainless steel and a Nimonic ring is employed, the disc may be surface hardened. Surface hardening may be carried out in any convenient manner, such as by plasma-nitriding or plating.

According to a second aspect of the invention in a butterfly valve assembly of the kind set forth the seal assembly comprises a resilient metal ring which in transverse cross-section comprises a substantially radially inwardly extending arm, the radially outer end of the arm is clamped to the valve body, and the radially inner end of the arm is adapted to engage with the seal engaging surface of the disc, at least when the metal ring is operative to provide a seal, and the metal ring is arranged such that, when it is operative, for deflection of the disc in one axial direction of the fluid flow passage from its normal position the radially inner end of the arm pivots about a first fulcrum point, and that for deflection of the disc in the opposite direction from its normal position the radially inner end of the arm initially pivots about the first fulcrum point, but then the intermediate portion of the arm engages with a rigid support surface which provides a second fulcrum point, spaced radially inwardly of the first fulcrum point, for further deflection of the arm in the same direction.

The term 'normal position' of the disc is intended to mean the position of the closed disc when the disc is not subjected to fluid pressure forces.

Whilst the arm is pivoting about the second fulcrum point it is effectively stiffer than when it is pivoting about the first fulcrum point. Thus the stiffness of the arm is increased during the latter part of the axial movement of the disc in said opposite direction to provide a relatively increased sealing force between the arm and the disc, but since the arm is still capable of pivotal movement about the second fulcrum point a rigid blocking action is avoided.

Since for a substantial part of the range of axial deflection of the disc the arm is pivoting about the radially outer first fulcrum point the arm stresses may be kept within the elastic limit of the material of the metal ring, which might otherwise be exceeded if the arm were made to pivot about the second fulcrum point throughout its range of movement.

The support surface is preferably provided on a retaining ring for the seal assembly.

Preferably the fulcrum points are arranged such that the second fulcrum point becomes operative when the front of the disc is being subjected to fluid pressure, that is when the disc is being deflected rearwardly.

Particular advantages are achieved when the metal sealing ring is arranged in accordance with both the first and second aspects of the invention, since then the change in fulcrum point during rearward displacement of the disc results in a relatively increased sealing force, and for forward displacement of the disc the interference forces produced by rolling result in a relatively increased sealing force. Such a valve therefore has a bi-directional sealing characteristic.

A third aspect of the invention is concerned with the arrangement of a polymeric sealing ring in a butterfly valve of the kind set forth. Polymeric seats constructed of, for example P.T.F.E., have been proposed for controlling the flow of various liquids, particularly hydrocarbons.

Although P.T.F.E. has a certain degree of resilience it has a poor memory so that difficulties have arisen in obtaining repeatable sealing characteristics.

According to the third aspect of the invention in a butterfly valve of the kind set forth the seal assembly comprises a polymeric sealing ring which in transverse cross-section comprises a heel which points forwardly of the disc and is received as an interference fit within a complementary recess provided in the housing, and a radially inwardly directed limb which is supported on its forward side by a support face of the housing, the support face terminating closely adjacent to the seal engaging surface of the disc in its closed condition, and a resilient metal energiser ring which is clamped to the housing radially outwardly of the heel and extends radially inwardly in face contact with the rear side of the limb, the energiser ring being resiliently prestressed to exert a forward axial force on the limb and heel, and the energiser ring extending substantially to the sealing face of the disc in its closed condition.

Thus the polymeric seal, apart from the portion which engages with the disc, is substantially confined and spring-compressed, so that any tendency of the polymeric seal to distort or flow will necessarily urge said portion radially inwardly to increase the sealing effectiveness.

Engagement of the disc with the polymeric seal will tend to urge the seal radially outwardly, but this movement can only be accommodated by flexing of the energiser ring. Thus, the shape of the polymeric seal will tend to be held over a long period of use, the spring-loaded limb acting as a reservoir of seal material from which seal material is expelled and to which it is returned.

The spring-loading is also able to accommodate changes in dimensions of the polymeric seal caused by temperature changes.

One particular advantage of this arrangement is that the energiser ring may also constitute the metal ring is a valve in accordance with either or both of the first and second aspects of the invention. The energiser ring preferably then does not contact the disc during normal operation but provides a fire-safe back-up seal in the event that the polymeric seal is destroyed.

The invention will now be further described, by way of example only, with reference to the accompanying drawings in which.

Figure 1:
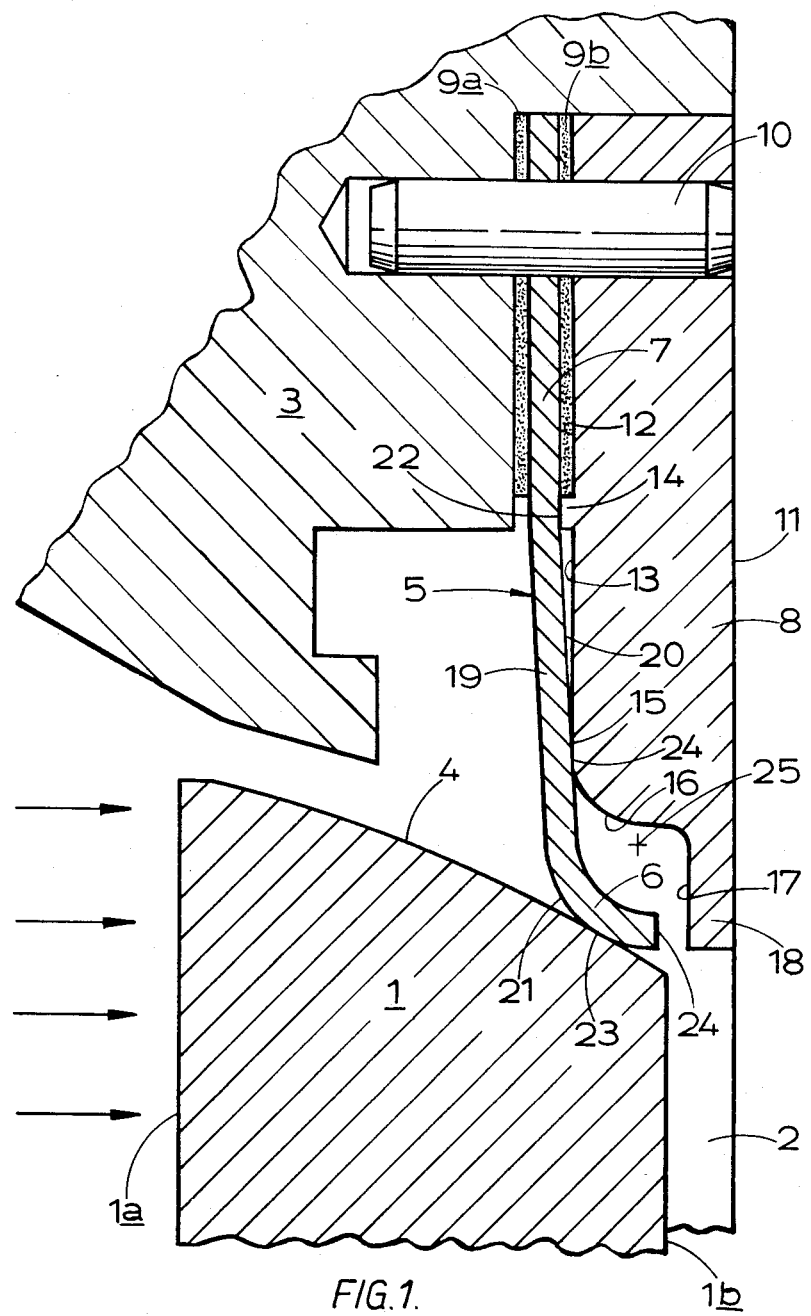
FIG. 1 is a radial cross-sectional partial view through a butterfly valve in accordance with the invention and employing a single metal sealing ring, the valve disc being shown in the closed condition and subjected to fluid pressure forces on its front face.

With reference to FIG. 1, a valve disc 1 of stainless steel is mounted in the through-flow passage 2 of an annular valve housing 3 by pivot means, not shown, which enable the disc to be pivoted in well known manner about an axis extending transversely of the flow passage 2. The edge of the disc presents a seal engaging surface 4 which is an annular portion of a sphere. In well known manner the pivotal axis of the disc is offset in two perpendicular directions from the centre of curvature of the surface 4.

For convenience, the larger diameter side 1a of the disc will be termed the 'front face', and the opposite side 1b will be termed the 'rear face'.

A single metal sealing ring 5 has been formed from a flat disc of Nimonic by spinning the radially inner margin of the disc to form a part-circular, in transverse cross-section, annular sealing lip 6. The sealing lip 6 is of substantially the same thickness as the remainder of the ring, extends through an arc of substantially 100° and is tangentially connected to the remainder of the ring. Lip 6 is work-hardened during spinning. Apart from the sealing lip 6, the ring 5 is flat, when not engaged by the disc 1, and its radially outer part 7 is clamped to the housing 3 by an annular retaining ring 8, a pair of graphite annular gaskets 9a and 9b being provided to prevent fluid flow around the clamped part 7 of the ring 5. The graphite gaskets can withstand high temperatures and therefore assist in providing a fire-safe characteristic.

Circumferentially spaced SPIROL (trademark) locating pins are provided to locate the part 7 of ring 5 during assembly. Conventional clamping means (not shown) are provided axially to clamp the retaining ring 8 to the housing 3.

Figure 2:
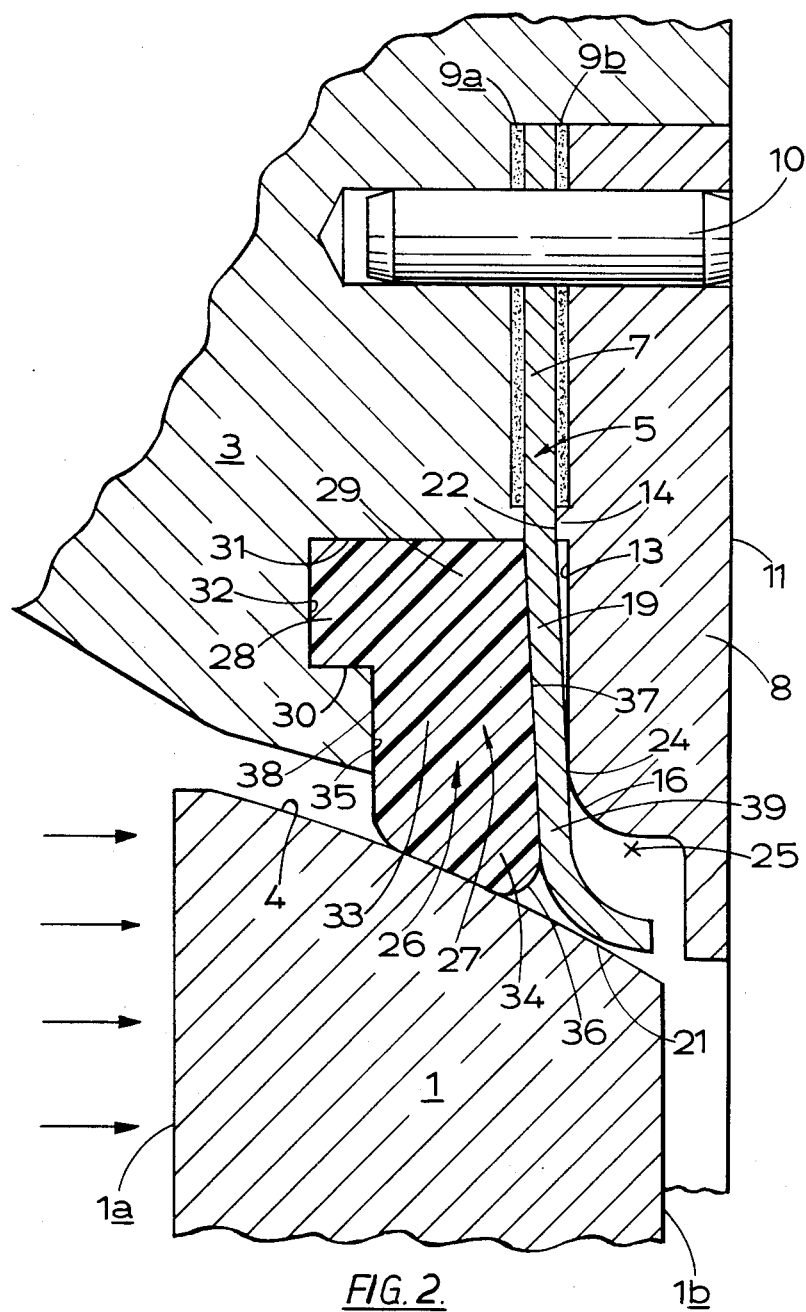
FIG. 2 is a view similar to FIG. 1 of a modified valve incorporating a polymeric sealing ring, the valve being shown in the same condition as that of FIG. 1.

Housing 3 is a dual purpose housing and is shaped to accept a polymeric seal when this is required in the version of FIG. 2. With further reference to FIG. 1, retaining ring 8 is provided with a plain radial rear face 11 and a front face having co-planar face portions 12 and 13 which extend parallel to face 11 but which are separated by an annular rib 14 of height substantially equal to the thickness of gasket 9b. At point 15 the face portion 13 leads tangentially into a quarter-round convex support face 16 which blends at its opposite end into a radial face 17. Radial face 17 together with rear face 11 define an inner rim 18 of the retaining ring 8, which rim is dimensioned to comply with British Standard No. 5155.

As viewed in transverse cross-section, the sealing ring 5 has the form of a radially inwardly extending arm of which the intermediate portion 19 between clamped portion 7 and sealing lip 6 is capable of being resiliently deflected.

When the disc 1 is in an open condition the intermediate portion 19 of the ring 5 is coplanar with the clamped portion 7, and rear face 20 extends parallel to surface portion 13 and is spaced therefrom by the height of rib 14. When no fluid is flowing through the valve and the disc 1 is rotated to the closed position the surface 4 of the disc will engage with the convex surface 21 of sealing lip 6 and deflect the intermediate portion 19 slightly in the rearward direction by pivotal movement of portion 19 about a first fulcrum point 22. The locus of the fulcrum points for all the elemental sections of the seal assembly is of course a circle about the axis of passage 2.

During the initial flexing of intermediate portion 19 associated with closing of the valve disc the effective length of the flexible portion of the arm is thus equal to the distance between fulcrum point 22 and the point of contact 23 of the sealing lip 6 with the disc surface 4.

If the valve disc 1 in the closed position is subjected on its front 1a to increasing fluid pressure it will be progressively deflected rearwardly due to various factors such as a small amount of flexibility in the pivot mountings. The initial rearward displacement of the disc edge during this first stage of pressurisation will be accommodated by further flexing of intermediate portion 19 about first fulcrum point 22, but before the maximum operating pressure of the valve has been reached the intermediate portion 19 will engage with the support surface 16 at point 24, slightly radially inward of point 15.

On further increase of fluid pressure on the front face 1a rearward displacement of the disc 1 will result in flexing of the unclamped portion of the metal ring about point 24 which thus acts as a second fulcrum point. The second fulcrum point 24 may move slightly around the support surface 16 as the fluid pressure is increased to the full operating pressure. The effective length of the flexible portion of the arm during this second stage of pressurisation is thus equal to the distance between the second fulcrum point 24 and the point of contact 23. Since this length is less than half the effective length during the first stage of pressurisation the stiffness of the seal is substantially increased during the second stage of pressurisation, and as a result the sealing force exerted by the sealing lip 6 on the disc surface 4 is substantially increased during the second stage of pressurisation.

In addition to the sealing force generated by flexing of the intermediate portion 19, the radial expansion of the sealing lip 6 caused by the rearward movement of the tapering surface 4 will provide an additional sealing force.

It is to be noted that free end 24 of the sealing lip 6 is spaced from surface 17, so that the metal ring is resiliently deformable throughout the range of operating pressures of the valve and the ring does not become solid at any pressure within that range.

The operation of the valve when the closed disc 1 is subjected to fluid pressure on its rear face 1b will now be described. As previously described, closure of the disc in the absence of fluid pressure forces results in slight deflection of the intermediate portion 19 in the rearward direction about first fulcrum point 22. In this condition the application of fluid pressure to the rear face 1b of the disc 1 will result in the sealing lip 6 being urged towards the disc 1 by fluid pressure acting on the intermediate portion 19 and on the sealing lip 6. When the fluid pressure on the rear face is increased the disc 1 is progressively displaced in the forward direction, to the left in FIG. 1. The unclamped portion of the sealing ring 5 will be urged in the forward direction by fluid pressure to follow the forward movement of the disc 1, and initially by the resilient forces produced in the ring 5 on closure of the disc.

Since the sealing lip 6 is held in firm contact at point 23 with the disc surface 4, the sealing lip 6 will tend not to slide relative to the disc surface 4 as the disc is progressively displaced forwardly, but instead the lip 6 will tend to roll on the surface 4 as the point of contact inevitably changes slightly in position with the constrained pivoting of the intermediate portion 19 as the sealing lip 6 moves axially in unison with the disc.

Since the centre of curvature 25 of sealing lip 6 is located axially rearwardly of the fulcrum point 22 so that the sealing lip 6 is directed rearwardly, the point of contact 23 is located axially rearwardly of the fulcrum point 22. This means that the convex surface 21 of the sealing lip 6 tends to move radially inwardly by a certain amount when the sealing lip moves forwardly. Since the surface 4 tapers radially inwardly to the rear, forward displacement of the disc results in an effective reduction in the diameter of the disc at the point of contact 23. By a careful choice of the curvature of sealing lip 6 and the length of the sealing arm between first fulcrum point 14 and the point of contact 23, in relation to the taper of surface 4, it is arranged that for a given amount of axial movement of the disc 1 and sealing lip 6 the corresponding radially inward dispacement of the sealing lip 6 at the point of contact 23 due to pivotal movement of the arm in its free state is greater than the actual radially inward displacement permitted by the corresponding change in diameter of surface 4. Thus, a wedging effect is produced by the rolling contact beween the convex surface 21 and the seal engaging surface 4 of the disc, which results in a progressively increasing sealing force between the lip 6 and the disc as the disc is displaced forwardly by increasing fluid pressure on its rea4r face 1b.

The work-hardening of the sealing lip 6 during spinning of the ring 5 assist in preventing galling between the sealing lip 6 and the disc during this wedging action. The seal engaging surface 4 of the disc is finished to a surface finish specification of 4 microns. In addition, in order to obtain a hardness difference of at least 75 Vickers between the engaging surfaces of the ring and disc, when the disc is of stainless steel the disc is hardened by plasma-nitriding. It is important that the curvature of the sealing lip 6 be chosen to maintain the edging force within limits. If the wedging forces are made too great galling may occur which will limit the life of the metal sealing ring. The best shape of sealing lip is most easily determined by experimentation.

Thus, the sealing arrangement of FIG. 1 provides a metal seal which increases in stiffness, yet remains resilient, for fluid pressure forces acting in one direction, and for fluid pressure acting in the opposite direction an incresed sealing force is produced by a rolling-wedging action between the seal and the valve disc. Such a valve therefore has a bi-directional sealing characteristic, and since the metal ring 5 will be substantially unaffected by fire the bi-directional sealing characteristic will be retained after a fire.

FIG. 2 shows a modification of the valve of FIG. 1 which incorporates an annular polymeric sealing ring 26 which acts as a primary seal, the metal sealing ring 5 providing a back-up seal in the event that the primary seal is destroyed by fire but also serving as an energiser for the ring 26 in normal use. Parts corresponding to those of FIG. 1 have been given corresponding reference numerals.

Sealing ring 26 has been turned from glass-filled P.T.F.E. It comprises, in transverse cross-section, a limb 27 of generally oblong-rectangular shape, with its major dimension extending radially, and a forwardly directed heel 28 also of oblong-rectanglular shape. Heel 28 is provided to locate the radially outer end 29 of the limb 27 against radial movement, and is received within a rearwardly facing recess of complementary shape in the housing 3 defined by opposing axial surfaces 30 and 31 and a radial face 32. The heel 28 is dimensioned to be an interference fit between faces 30 and 31 on assembly of the sealing ring 26 to housing 3.

The intermediate part 33 of limb 27 between outer end 29 and a part 34 which projects from the housing 3 is supported on its front face 38 by a radial support surface 35 of the housing, support surface 35 extending substantially to the surface 4 of the disc 1 when the disc is in its closed condition. The rear face 37 of limb 27 for substantially all of its radial length, that is apart from rounded corner 36, is engaged by the intermediate portion 19 of the metal ring 5.

Front face 37 in the undeformed state of the ring 26, and in the assembled condition of ring 26, is inclined so that it is derected radially inwardly and rearwardly by a small amount. Since the junction between surfaces 30 and 37 is arranged to be adjacent to rib 4 and first fulcrum point 22, the intermediate portion 19 of metal ring 5 is flexed rearwardly about the fulcrum point 22 by surface 37 on assembly of the valve. The flexing of the metal ring 5 is sufficient to prevent the disc surface 4 engaging with the sealing lip 6 of the metal ring 5 in normal use. The metal ring is thus pre-stressed during assembly to provide an axial force retaining heel 28 firmly in the recess of valve housing 3 and squashing the intermediate portion 33 of seal 26 against support face 35.

Apart from the projecting part 34 the seal 26 is completely confined by the housing walls 30, 31, 32 and 35 and by the intermediate portion 19 of the metal ring 5, and is subject to compressive forces by the metal ring 5. Thus any radially outward movement of seal part 34 is accommodated by flexing of the metal ring 5, and there is always a tendency for the seal part 34 to be squeezed radially inwardly by the effect of the intermediate part 19 on the confined parts of the seal 26. Any differential expansion and contraction of the seal 26 relative to the material of the valve housing 3 will also be accommodated by flexing of intermediate portion 19. This is particularly important when the valve is used for cryogenic applications.

The intermediate portion 19 thereby acts as an energiser for the seal 26.

When the valve disc is moved to the closed condition, with no fluid pressure forces acting upon it, the seal part 34 will be urged radially outwardly and rearwardly by a small amount to flex the intermediate portion 19 further rearwardly about fulcrum point 22 to bring portion 19 closer to fulcrum point 24 but spaced slightly therefrom. On the application of fluid pressure forces to the front 1a of the disc the disc is displaced rearwardly, and resulting further movement of the projecting portion 34 brings the intermediate portion 19 into engagement with the surface 16, as shown in FIG. 2, to provide second fulcrum point 24, about which the metal seal part 39 flexes on further increase of fluid pressure to accommodte rearward movement of seal part 34. Thus the ability of seal part 34 to be deflected is reduced for further increases in pressure on face 1a once the fulcrum point 24 has been engaged, and the effective stiffness of part 34 is thereby increased at high pressures to provide an increased sealing force between the seal 26 and disc surface 4.

Considering now the effect of fluid pressure on the valve in the opposite direction, that is fluid pressure applied to rear face 1b of the disc in its closed condition, the disc 1 is deflected forwardly, to the left in FIG. 2, and fluid pressure forces act over the full area of the right hand side of intermediate portion 19 to squeeze the confined parts 29 and 33 of seal 26. There is therefore a tendency for the projecting part 34 of the seal 26 to be squeezed radially inwardly to maintain the sealing force with the surfacce 4 which is effectively reduced in diameter due to forward displacement of the disc 1.

An effective seal is therefore provided to both directions of fluid flow through the valve.

In the event of a fire in the valve of FIG. 2 which destroys the polymeric ring 26, the metal ring 5 will provide a bi-directional seal in an identical manner to the valve of FIG. 1.

Figure 3:
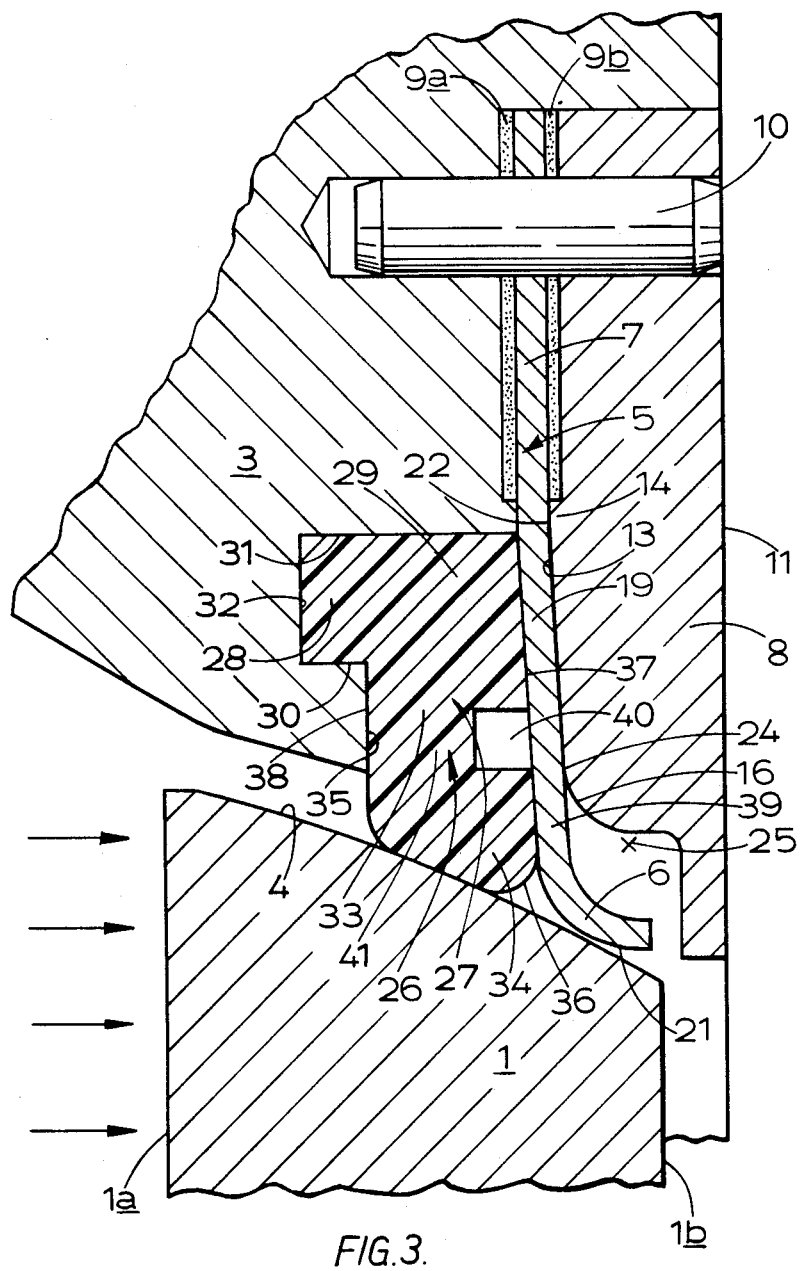
FIG. 3 is a similar view but of a modification to the valve of FIG. 2.

The valve of FIG. 3 is identical to that of FIG. 2 apart from the shape of surface 13 and the presence of an annular recess 40 in the rear face of seal limb 27. Surface 13 in this construction extends smoothly from fulcrum point 22 to support surface 16 so that on rearward deflection of the intermediate portion 19 of the sealing ring from its assembled condition, the portion 19 is fully supported by intimatecontact with surface 13.

Recess 40 is provided to define a neck 41 in limb 27 of the sealing ring 26 thereby to enable increased pivoting of the projecting part 34 through flexing of neck 41, to accommodate changes in the angle of the contacted portion of surface 4 resulting from deflections of the disc 1.

In a further modification, the annular gaskets 9a and 9b are replaced by respective gas-filled metal 0-rings.

We claim:

1. A butterfly valve comprising a valve body provided with a fluid flow passage, a valve disc pivotally mounted in the passge for rotation about an axis extending subsantially transversely of the passage, and an annular seal assembly carried by the body and encircling the fluid flow passage, said disc having a seal engaging surface which sealingly engages with the seal assembly in the closed position of the disc to close the flow passage, said seal engaging surface tapering radially inwardly of the disc from the front to the rear of the disc, said seal assembly comprising a resilient metal ring which in transverse cross-section comprises a radially inwardly extending arm, the radially outer end of the arm being clamped to the valve body and the radially inner end of the arm presenting a convex surface for engagement by the seal engaging surface of the disc, at least when the metal ring is operative to provide a seal, and a rigid support surface rigidly connected with said valve body, said metal ring being arranged such that for rearward deflection of said disc from the normal closed position of said disc the unclamped portion of said arm initially pivots about a first fulcrum point, but then an intermediate portion of said arm engages with said support surface which provides a second fulcrum point, spaced radially inwardly of said first fulcrum point, for further deflection of said radially inner end of said arm in the rearward direction, and the arrangement being such that the point of contact of said convex surface with the disc is located in a rearward direction of the disc from said first fulcrum point.

2. A valve as in claim 1 wherein said support surface is a convex surface facing radially inwardly of said flow passage and forwardly of said valve disc, whereby said second fulcrum point moves radially inwards as said radially inner end of said arm is deflected in the rearward direction.

3. A valve as in claim 2 wherein said intermediate portion of said arm between said first and second fulcrum points is substantially straight when said arm is in the position in which it has just made contact with said support surface.

* * * * *